April 12, 1949.  R. A. W. SPOONER  2,467,100
PIPE AND CABLE COUPLING
Filed May 16, 1945  3 Sheets-Sheet 1
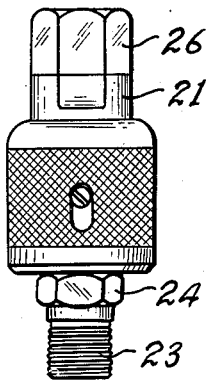
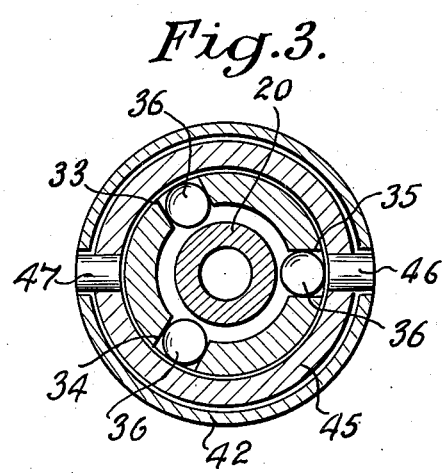
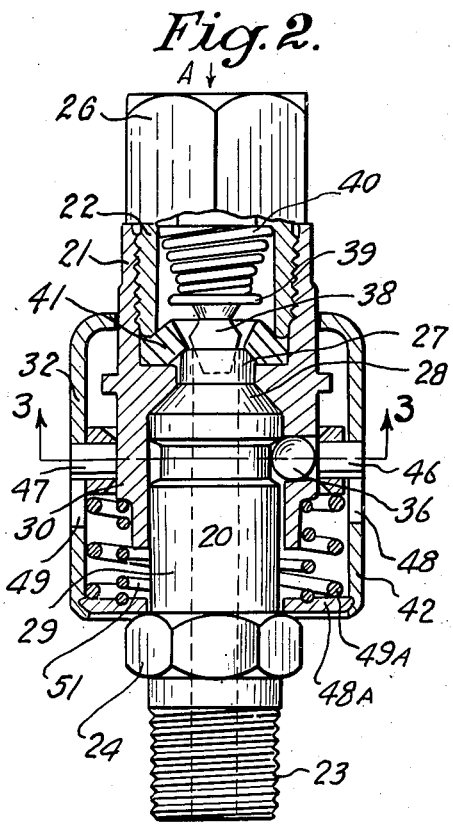
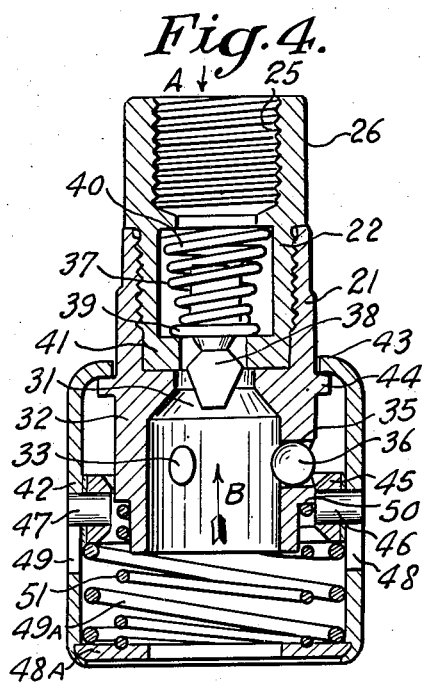
INVENTOR
Reginald A. W. Spooner
ATTORNEY April 12, 1949.　　R. A. W. SPOONER　　2,467,100
PIPE AND CABLE COUPLING
Filed May 16, 1945　　　　　　　　　　　　3 Sheets-Sheet 2
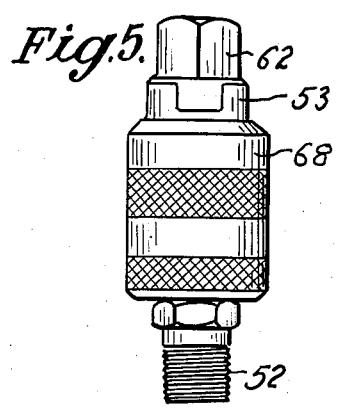
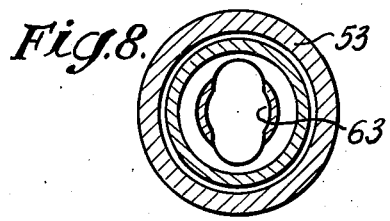
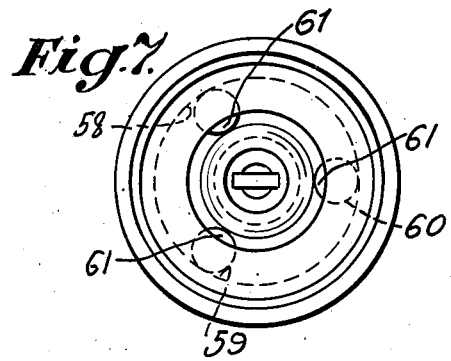
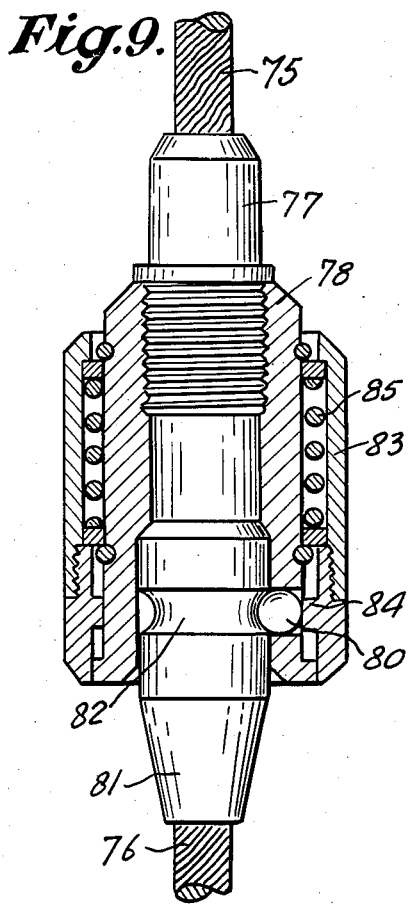
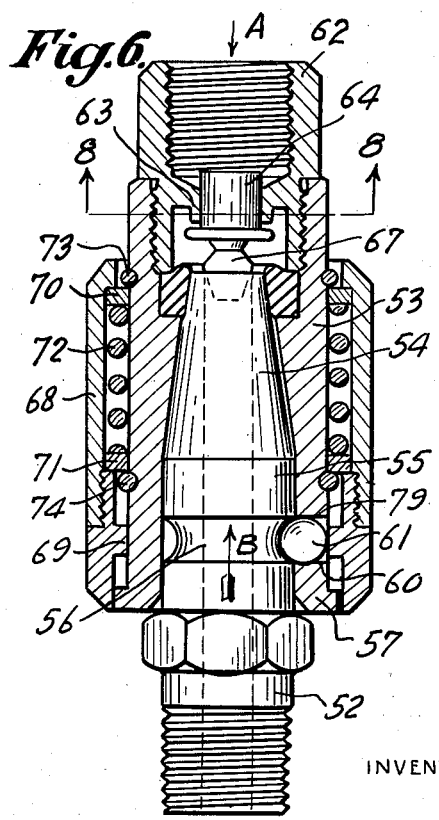
INVENTOR
Reginald A. W. Spooner
ATTORNEY April 12, 1949.
R. A. W. SPOONER
2,467,100
PIPE AND CABLE COUPLING
Filed May 16, 1945
3 Sheets-Sheet 3
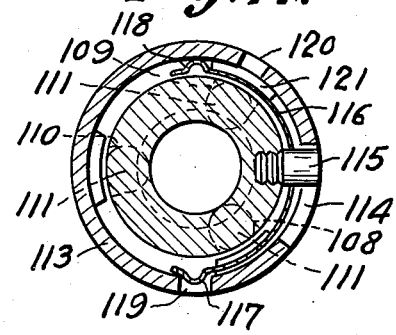
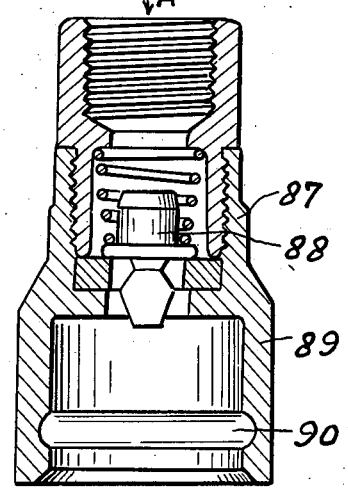
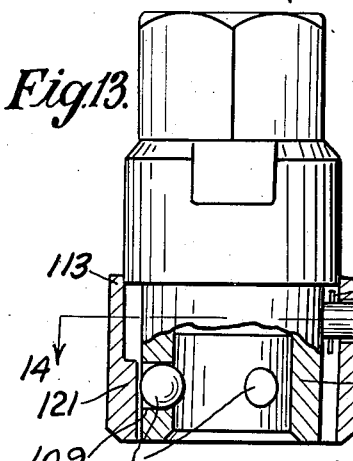
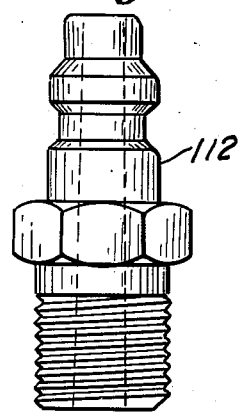
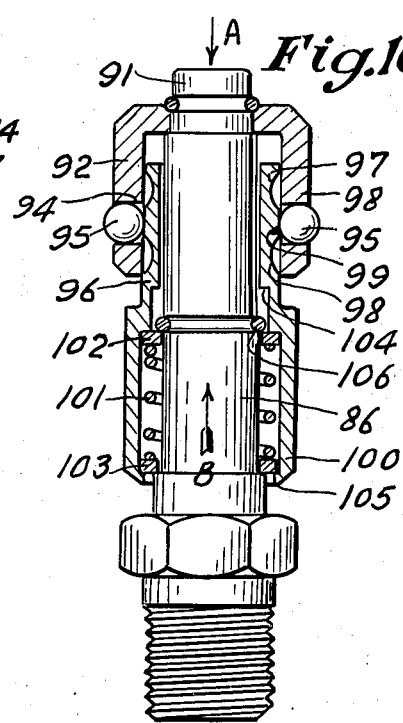
INVENTOR
Reginald A. W. Spooner
ATTORNEY Patented Apr. 12, 1949

2,467,100

UNITED STATES PATENT OFFICE 2,467,100

PIPE AND CABLE COUPLING

Reginald Arthur William Spooner, Walton on Thames, England

Application May 16, 1945, Serial No. 594,109
In Great Britain May 18, 1944

1 Claim. (Cl. 285—176)

The present invention relates to a coupling for pipes, tubes, rods, cables, wires and the like.

Objects of the invention are to provide a coupling which can be easily and quickly engaged and disengaged, preferably by a straight push or pull of the parts to be coupled, and which, in the case of a pipe or tube coupling, is fluid-tight.

According to the invention there is provided a two-part coupling for pipes, tubes, rods, wires and the like, comprising a plug having a body of circular external section and a socket having a tubular nose, a recess formed in one of said parts and a radial bore formed in the other, a locking member movable in said bore, and a sleeve slidably mounted on the radially bored part serving, in one position, to allow the locking member to move radially in its bore to a position such that the plug may be inserted in the socket and, in another position, to retain the locking member in such a radial position in its bore that it may engage the recess and thus hold the plug and socket securely in engagement.

Preferred embodiments of the invention will now be described with reference to the accompanying diagrammatic drawings in which, Figures 1 and 2 are elevations, Figure 2 being in section, of a coupled plug and socket constructed and arranged to operate in accordance with the invention, Figure 3 is a transverse section on the line 3—3 of Figure 2, Figure 4 is a sectional elevation of the socket shown in Figures 1 and 2, Figures 5 and 6 are elevations, Figure 6 being in section, of another embodiment of the invention, Figure 7 is an end view of the socket illustrated in Figure 6, Figure 8 is a transverse section on the line 8—8 of Figure 6, the check valve shown in Figure 6 being omitted, however, Figure 9 is a sectional elevation of a coupling suitable for solid rods, cables, wires and the like, Figures 10 and 11 are sectional elevations of a plug and socket respectively forming another embodiment of the invention, Figures 12 and 13 are sectional elevations of a plug and socket respectively, the coupling of which is accompanied by a relative rotation of the two parts, Figure 13 being a section on the lines 13—13 of Figure 14, and Figure 14 is a transverse section of the socket shown in Figure 13.

The coupling illustrated in Figures 1 to 4 inclusive is designed to couple together two pipes and comprises a conical plug, indicated generally at 20 (Figure 2) which may be fitted into a correspondingly conical socket 21 into the rear end of which is screwed a shank 22. In order that the pipes to be coupled (not shown) may be attached to the plug and socket respectively the former is externally screw-threaded as at 23 and is formed with a nut-shaped section 24, whilst the socket shank 22 is internally screw-threaded as at 25 and is formed with a nut-shaped section 26.

The plug 20 comprises a cylindrical entering portion 27, a conical nose 28 and a cylindrical body 29 formed with an annular recess 30. The plug is formed with a cylindrical bore for the passage of fluid therethrough.

The socket comprises a cylindrical body portion 21 internally coned as at 31 (Figure 4) having a tubular nose 32 in the wall of which are formed three symmetrically and equi-angularly disposed radial bores 33, 34 and 35 (Figure 3). In each bore is a locking member in the form of a spherical steel ball 36. The ends of each bore are preferably of reduced diameter to prevent the ball from falling out of its bore. Sliding pegs, rollers, or the like may be used in place of the steel balls.

The shank 22 of the socket serves as a housing for a check valve 37 formed with a flat diamond-shaped head 38 and a flange 39 urged, by a spring 40, into contact with a rubber valve-seat 41 held between the body and shank of the socket.

Slidably mounted around the externally cylindrical socket is a sleeve 42, the rear end of which is formed with an internal flange 43 engaging, in one extreme axial position of the sleeve on the socket, an external flange 44 formed on the socket body 21. Movable between the sleeve and socket is a ring 45 into which are secured two diametrically opposite pins 46 and 47 movable in short axial slots 48 and 49 respectively formed in the sleeve 42. The outer end of the sleeve 42 is provided with an end-plate 48A apertured to take the plug 20. Between the ring 45 and plate 48A is a helical spring 49A, whilst the socket is shouldered as at 50 to receive a helical spring 51 the other end of which also bears against the end-plate 48A.

The device functions as follows:

Before the plug is inserted, the socket and sleeve take the relative positions shown in Figure 4. The spring 51 tends to urge the socket and sleeve axially apart, the sleeve being retained on the socket by engagement of the flanges 43 and 44 on these two members respectively. The ring 45 is urged away from the end plate 48A by the spring 49A, the pins 46 and 47 thus being at the end of the slots 48 and 49 remote from the end plate 48A. In this position the ring 45 is out of register with the bores 34 and 35 in the tubular nose of the socket so that the balls 36 are free to move radially in their respective bores.

When the socket 21 is held firmly and the plug 20 is pushed into it, the conical nose 28 of the plug first makes contact with any of the balls which may be protruding inwardly from the inner wall of the tubular nose of the socket and pushes these balls radially outwards. Approximately simultaneously, the enlarged nut-shaped section 24 of the plug makes contact with the end-plate 48A of the sleeve 42 so that further movement of the plug into the socket is accompanied by a siding motion of the sleeve, over the socket, against the action of the spring 51. Simultaneously the balls 36, now in their extreme outward positions, push the ring 45 towards the end plate 48A, the pins 46 and 47 meanwhile riding in the slots 48 and 49 respectively, until the plug has entered the socket a distance sufficient to allow the balls 36 to move radially inwards into the annular recess 30 in the cylindrical body of the plug. The balls are snapped into the recess by the ring 45 which is urged away from the end plate 48A by the spring 49 and after the balls have entered the recess the ring 45 is left free to spring in the direction of arrow B so as to cover the outer ends of the bores 35. The balls are thus held in engagement with the plug which in this manner is locked positively in the socket. The conical nose 28 of the plug has meanwhile seated upon the correspondingly conical portion 31 of the socket, whilst the entering section 27 of the plug has made a fluid-tight joint with the rubber valve-seat 41 and has made contact with the head 38 of the valve 37 and pushed the valve flange 39 off the valve-seat 41. Fluid may thus pass, without leakage, in the direction of the arrow A, through the coupled socket and plug. It will be noted that the action of coupling the components, which is achieved by a straight axial push of the plug with respect to the socket, serves also to open the valve 37 for the flow of fluid therethrough. Similarly the action of uncoupling the components also serves to close the valve 37.

Uncoupling is achieved by a straight axial pull of the plug 20 with respect to the sleeve 42. The sleeve 42 is gripped and moved in the direction of arrow B over the socket, the ring 45 being moved with it by spring 49A, thus allowing the balls 36 to move radially outwards so that the plug may be withdrawn from the socket, whereupon the sleeve is released and returns to the position shown in Figure 4, the valve 37, be it noted, being urged on to its seat by spring 40 so that flange 39 again makes fluid-tight contact with the rubber valve-seat 41.

The coupling illustrated in Figures 5 to 8 inclusive is also designed to couple together two pipes or tubes (not shown) and for this purpose the plug 52 and socket 53 are each threaded and provided with nut-shaped sections as in the case of the previous embodiment.

The bored plug 52 is formed with an externally conical nose 54 and a cylindrical body 55 having an annular recess 56.

The socket comprises an internally conical body 53 the tubular nose 57 of which is cylindrical and is formed with three equi-angularly disposed radial bores 58, 59 and 60 (Figure 7) each containing a locking member in the form of a steel ball 61. This part of the socket is substantially similar to that of the previously described embodiment.

Into the rear end of the socket 53 is screwed an internally threaded shank 62 formed with an internal bearing 63 for the stem of a check valve 64 whilst between the shank 62 and socket-body 53 is held an annular rubber valve-seat 65 which serves, as in the previous embodiment, amongst other things to prevent leakage of fluid between the shank and body. The check-valve 64 is formed with a circular flange 66 and a flat diamond-shaped head 67. The bearing 63 is constructed of the internal shape shown in Figure 8 in order to allow fluid to pass around the stem of the check valve 64 at all times.

Slidably mounted on the socket is a two-part sleeve 68 formed with an internal flange 69, and housed between washers 70 and 71 is a spring 72 movement of which is limited by a pair of rings 73 and 74 fixedly located in circumferential grooves formed in the socket 53.

This device functions in the following way.

When in the coupled positions shown in the figures, the end of the conical nose 54 of the plug makes fluid-tight contact with the valve-seat 65 and serves to hold the check-valve 64 off the valve-seat 65. Fluid can thus pass, in the direction of the arrow A, through the bearing 63 around the stem and flange of the check-valve 64, on either side of the head 67 of the check-valve and into the bore of the plug 52. The plug 52 is prevented from coming out of the socket under the pressure of the fluid by virtue of the fact that the balls 61 engage the recess 56 in the plug body and are positively locked therein since the internal flange 69 registers with the bores 58, 59 and 60.

When it is desired to disconnect the coupling the outer end of the plug 52, or the pipe connected to it, is gripped in one hand and the sleeve 68 in the other and these members are pulled apart with a straight axial pull. The sleeve 68 moves towards the shank 62 thereby compressing spring 72 and thus allowing the balls 61 to move radially outward partially into the space between the socket and sleeve, thus allowing the plug to be withdrawn from the socket, after which the spring 72 returns to its original position and the balls 61 again take up the positions illustrated in Figures 6 and 7.

As the coupling is broken the head 67 of the valve 64 is freed and fluid pressure urges the check valve 64 in the direction of arrow B until the flange 66 makes a fluid-tight seal on the rubber valve-seat 65.

The coupling is remade by a straight axial push between the plug and sleeve. As soon as the conical nose of the plug makes contact with the inwardly projecting balls, further push causes the sleeve to slide away from the shank 62 against the action of the spring 72, so that flange 69 is moved out of register with the bores 58, 59 and 60 thereby allowing the balls 61 to emerge radially and partially from their bores, so that the plug may be pushed home in the socket. When the sleeve is released the spring 72 urges it to the right thereby forcing the balls inwardly in their bores to engage the channel 56 in the plug.

The device illustrated in Figure 9 is designed to couple together two cables 75 and 76 and comprises locking mechanism substantially similar to that of Figure 6. The cable 75 is swaged or otherwise connected with a shank 77 which can be screwed into a tubular socket 78 formed with radial bores one of which is shown at 79 and in which rides a steel ball 80. The other cable is connected with a plug 81 having a cylindrical body formed with an annular recess 82. Around the socket is a sleeve 83 formed with an internal flange 84 and controlled by a spring 85. This coupling is made and broken in precisely the same way as that described with reference to Figures 5 to 8, and its functioning will, it is thought, be clear from the foregoing description.

The embodiment of the invention illustrated in Figures 10 and 11 is similar to the two described with reference to Figures 1 to 8 except that the radial bores and locking members therein are arranged in the wall of the plug, whilst the recess in which the locking members engage is formed in the inside wall of the tubular nose of the socket.

Neither the plug 86 nor the socket 87 is tapered. The socket 87 houses valve mechanism 88 of the kind illustrated in Figures 1 to 8 and comprises a tubular nose 89 in the inside wall of which is formed an annular recess 90. The plug 86 comprises a tubular body the outer end 91 of which serves, as in the earlier embodiments, to unseat the valve 88 in the socket 87. The plug is provided over a portion of its length with an outer wall 92 in which are a pair of diametrically opposite radial bores 93 and 94 each containing a steel ball 95 which is free to move to a limited extent within its bore but is not free to fall out of its radial bore. Slidably mounted on the plug is a sleeve 96 formed with two annular channels 97 and 98 between which is an externally cylindrical flange 99. It will be seen that if the sleeve 96 is moved in either axial direction the steel balls 95 can fall into one or other of the channels 97 and 98. The sleeve 96 is formed with a shank 100 spaced from the plug and housing a spring 101 disposed between washers 102 and 103 slidable on the plug. The sleeve is internally shouldered as at 104 and is formed with an internal flange 105 engaging the washer 103. Movement of the sleeve away from the outer end 91 of the plug against the action of the spring 101 is limited by engagement of the shoulder 104 with a ring 106 fixed on the plug.

The device functions as follows:

The plug is inserted into the socket by a straight axial push between the sleeve and the socket and when the balls 95 engage the outer nose of the socket further push slides the sleeve 100 towards the outer end 91 of the plug 86 thereby allowing the steel balls 95 to recede inwardly into the channel 98 after which the plug is free to enter fully into the socket. When this fully coupled position has been reached the radial bores 93 and 94 are opposite the recess 90 in the socket and when the sleeve 100 is released the spring 101 returns it to the position shown in Figure 10, at the same time urging the balls 95 radially outwards into the recess 90 and thus locking the plug in the socket. During the coupling action the nose 91 of the plug pushes the valve 88 off its seat so that fluid may pass from the socket into the plug.

The coupling is broken by a straight axial pull between the socket and sleeve, the latter being moved in the direction of arrow A so that the balls 95 may fall into the channel 97 whereupon the plug may be retracted from the socket and when the sleeve is released it returns to the position shown in Figure 10 under the action of the spring 101, the valve 88 meanwhile having been returned by its spring to the position shown in Figure 11.

For certain purposes it may be desirable to make and break the connection between the coupling by rotating a sleeve with respect to the plug and socket instead of by sliding the sleeve axially. The basic idea by which such an angular connection can be made is illustrated in Figures 12, 13 and 14. The coupling here illustrated comprises a socket 107 provided with radial bores 108, 109 and 110 each of which contains a ball 111 which serves, as in the previous cases, to retain a plug 112 (of shape and function similar to that of Figure 2) within the socket 107. Around the socket is a sleeve 113 formed with a circumferential slot 114 into which projects the end of a pin 115 screwed into the socket 107. The sleeve 113 is thus fixed axially with respect to the socket 107 but may be rotated angularly within the limits of the slot 114. Housed within the sleeve 113 is a part cylindrical spring 116 formed with pips 117 and 118 co-operating with apertures 119 and 120 respectively formed in the sleeve 113. The spring is prevented from angular rotation by means of the pin 115 so that when the sleeve 113 is rotated around the socket 107 as it moves from one limiting position to the other a pip 117 or 118 snaps into its respective aperture 119 or 120 respectively. The sleeve 113 is formed with three projections 121 which, when the sleeve is in the position illustrated, register with the balls 111 thus forcing the latter radially inwards to engage the plug when the latter is within the socket 107. It will be appreciated that when the sleeve 113 is rotated to bring the pip 118 into its aperture 120 the projections 121 are placed out of register with the balls 111 thus allowing the latter to move radially outwards so that the plug can be withdrawn from the socket.

I claim:

A two-part coupling for pipes, tubes, rods, wires and the like, comprising a plug and socket, a recess formed in one of said parts and a radial bore in the other, a locking member movable in the bore, and a sleeve provided with a ring mounted on the bored part so as to be axially movable thereon, the arrangement being such that when the ring is axially out of register to one side of the locking member the latter may move in its bore to allow the plug to be inserted in the socket by a straight axial push, when the ring registers with the locking member the latter is retained in the said recess so that the plug and socket are locked together, and when the ring is axially out of register to the other side of the locking member the latter is again free to move in its bore so that the plug may be withdrawn from the socket by a straight axial pull.

REGINALD ARTHUR WILLIAM SPOONER.

REFERENCES CITED

The following references are of record in the file of this patent:

UNITED STATES PATENTS

| Number | Name | Date |
| --- | --- | --- |
| 1,800,045 | Bates | Apr. 7, 1931 |
| 1,873,914 | Adams | Aug. 23, 1932 |
| 2,102,774 | Williams | Dec. 21, 1937 |
| 2,255,333 | Scheiwer | Sept. 9, 1941 |
| 2,279,146 | Schneller | Apr. 7, 1942 |
| 2,322,877 | Parker | June 29, 1943 |